United States Patent
Piduri et al.

(10) Patent No.: US 11,010,264 B2
(45) Date of Patent: May 18, 2021

(54) SUPPORTING DATASTORE REPLICATION USING VIRTUAL MACHINE REPLICATION

(71) Applicant: Cisco Technology, Inc., San Jose, CA (US)

(72) Inventors: Sudarsana Rao Piduri, Campbell, CA (US); Swapnil Sham Daingade, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 111 days.

(21) Appl. No.: 16/133,782

(22) Filed: Sep. 18, 2018

(65) Prior Publication Data

US 2020/0089582 A1 Mar. 19, 2020

(51) Int. Cl.
| | |
|---|---|
| *G06F 11/00* | (2006.01) |
| *G06F 11/14* | (2006.01) |
| *G06F 11/20* | (2006.01) |
| *H04L 29/08* | (2006.01) |
| *G06F 9/455* | (2018.01) |

(52) U.S. Cl.
CPC ...... *G06F 11/1484* (2013.01); *G06F 9/45558* (2013.01); *G06F 11/1461* (2013.01); *G06F 11/1464* (2013.01); *G06F 11/203* (2013.01); *G06F 11/2094* (2013.01); *G06F 11/2097* (2013.01); *H04L 67/34* (2013.01); *G06F 2009/45575* (2013.01); *G06F 2201/815* (2013.01); *G06F 2201/84* (2013.01)

(58) Field of Classification Search
CPC ............. G06F 11/1461; G06F 11/1464; G06F 11/1484; G06F 11/203; G06F 11/2094; G06F 3/0619; G06F 3/0644; G06F 3/065; G06F 3/067
See application file for complete search history.

(56) References Cited

U.S. PATENT DOCUMENTS

| | | | |
|---|---|---|---|
| 9,405,630 B2 | 8/2016 | Duggan et al. | |
| 9,575,856 B2 | 2/2017 | Sugabrahmam et al. | |
| 9,575,858 B2 | 2/2017 | Sugabrahmam et al. | |
| 9,977,704 B1 * | 5/2018 | Chopra | ............... G06F 11/0709 |
| 10,146,634 B1 * | 12/2018 | Bishop | ................ G06F 11/1458 |

(Continued)

OTHER PUBLICATIONS

Kodeboyina, "Building and Protecting vSphere Data Centers Using Site Recovery Manager (SRM)", Mar. 2016, St. Cloud State University—the Repository at St. Cloud State (Year: 2016).*

(Continued)

*Primary Examiner* — Michael Maskulinski
(74) *Attorney, Agent, or Firm* — Edell, Shapiro & Finnan, LLC (57) ABSTRACT

A first server in, for example, a primary datacenter, may be paired with a second server in, for example, a backup datacenter. The first server may include a first datastore, which includes a plurality of virtual machines, and the second server may include a second datastore. The first and second datastores may then be mapped to each other. The plurality of virtual machines included in the first datastore are then, without any user prompting, replicated at the second datastore. Therefore, when the first server becomes unavailable, the virtual machines included in the first datastore may still be accessible at the second server.

13 Claims, 9 Drawing Sheets

(56) References Cited

U.S. PATENT DOCUMENTS

2015/0372945 A1* 12/2015 Pershin ................ H04L 47/808
709/225
2017/0262345 A1* 9/2017 Wang ................ G06F 11/1456

OTHER PUBLICATIONS

At-a-Glance, "Data Protection: Cisco HyperFlex Systems", LE-56903-00, Nov. 2016, http://www.cisco.com/go/hyperflex, 2 pages.
DataSheet, "VMware vCenter Site Recovery Manager 5 with vSphere Replication", http://www.vmware.com/products, VMW-DS-vCNTR-SRM5-vSphr-Rep-USLET-103, Dec. 2011, 4 pages.

* cited by examiner

SUPPORTING DATASTORE REPLICATION USING VIRTUAL MACHINE REPLICATION

TECHNICAL FIELD

The present disclosure relates to disaster recovery systems.

BACKGROUND

An enterprise may implement disaster recovery solutions to provide business continuity in the event that there is a site failure, for example. Disaster recovery solutions may involve replicating data and metadata from a first, primary datacenter to a second, backup datacenter. Often, the first datacenter and the second datacenter are geographically separate to improve protection. Disaster recovery solutions may provide an interface so that various storage replication solutions may integrate with the disaster recovery solution to facilitate data and metadata replication.

DESCRIPTION OF EXAMPLE EMBODIMENTS

Overview

Briefly, a first server in, for example, a primary datacenter, may be paired with a second server in, for example, a backup datacenter. The first server may include a first datastore, which includes a plurality of virtual machines, and the second server may include a second datastore. The first and second datastores may then be mapped to each other. The plurality of virtual machines included in the first datastore are then replicated at the second datastore. Therefore, when the first server becomes unavailable, the virtual machines included in the first datastore may still be accessible at the second server.

EXAMPLE EMBODIMENTS

Figure 1:
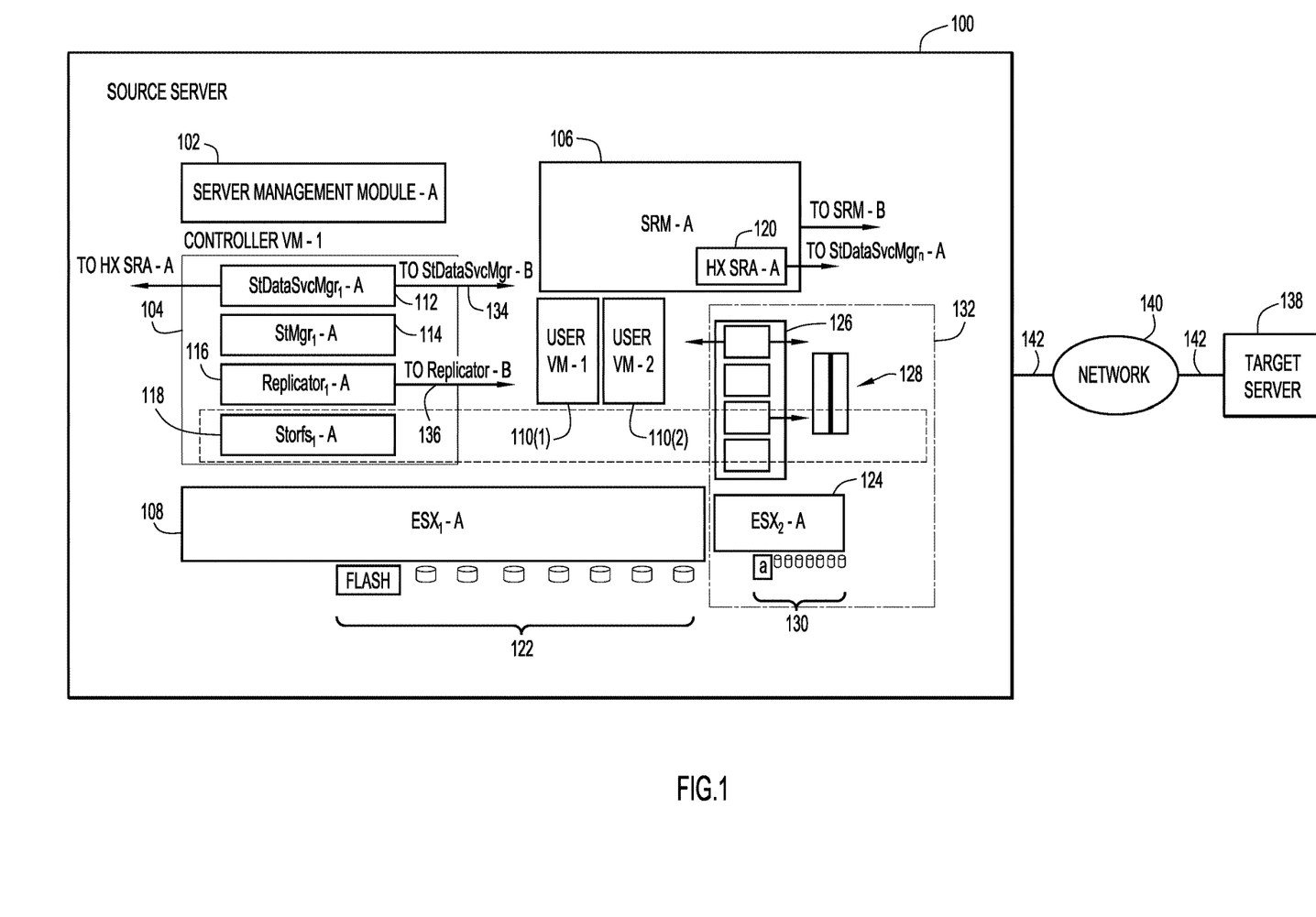
FIG. 1 is a block diagram of a source server in a first datacenter, according to an example embodiment.

With reference made to FIG. 1, shown is a block diagram of a source server 100 in a first datacenter, according to an example embodiment. The source server 100 may include a server management module (for example vCenter Server from VMware) 102, a controller virtual machine (VM) 104, a disaster recovery orchestration (for example Site Recovery Manager from VMware) module 106, a hypervisor module (for example ESX₁ from VMware) 108, and a plurality of user VMs 110(1)-110(2). The controller VM 104 may include a data service manager module 112, a systems manager module 114, a replicator module 116, and a file system module 118. The disaster recovery orchestration module 106 may include a storage replicator adapter (SRA) module 120. The SRA module 120 may communicate with the data service manager module 112. The hypervisor module ESX₁ 108 may also include a plurality of storage hardware 122, such as Flash drives or rotational disk drives.

A similar block diagram may be used to represent a target server 138. The target server 138 is shown in simplified form. The target server 138 may be used to replicate datastores stored on storage hardware 122 of the source server 100.

The source server 100 may communicate with the target server 138 via a communications network 140. The source server 100, the target server 138, and the communications network 140 may communicate with each other via one or more communication links 142. The communication links 142 may be wired communication links, wireless communication links, or a combination of wired and wireless communication links. Moreover, other network devices, such as routers, switches, proxy servers, etc. (not shown in FIG. 1) may enable communications between the source server 100 and the target server 138.

It also should be appreciated that any number of hypervisor modules, controller VMs, and user VMs may be included in the source server 100. For example, hypervisor module ESX₂ 124, a second controller VM 126, user VMs 128, and associated datastores 130 are shown in simplified form in box 132. In the figures, the elements of source server 100 are denoted as "A" while the elements of the target server 138 are denoted as "B". For example, the data service manager module 112 of the source server 100 may communicate with a data service manager module of the target server 138 as indicated at 134. Additionally, the replicator module 116 of the source server 100 may communicate with a replicator module of the target server 138 as indicated at 136.

The server management module 102 for the source server 100 and the target server 138 may be used to manage each hypervisor module, such as hypervisor module ESX₁ 108. For example, there may be four hypervisor modules. The various hypervisor modules may share a number of datastores. A control VM may also be associated with each hypervisor module.

A disaster recovery orchestrator module may be installed and running on both the source server 100, such as SRM module 106, and on the target server 138. The server management module 102 may pair the source server 100 with the target server 138 by pairing the SRM modules of the source server 100 and the target server 138. The SRM module 106 may orchestrate protection and recovery workflows between the source server 100 and the target server 138. For example, the SRM module 106 may select a VM for replication and/or recover a VM, such as user VM 110(1). However, the SRM module 106 may not implement replication itself. Rather, the SRM module 106 may assume that the storage hardware 122 manages replicating data between the source server 100 and the target server 138. For example, an external replicator may be used to facilitate the data replication and integrate with the SRM module 106. For example, the SRM module 106 may provide the SRA interface to enable an external replicator to implement SRA module 120 to integrate into the SRM module 106.

Typically, the storage hardware 122 has no knowledge of the user VMs 110(1)-110(2) while the SRM module 106 fully manages lifecycles for each user VM 110(1)-110(2). Therefore, the SRA interface 120 may be defined in terms of units of storage, or datastores.

The SRM module 106 may instruct the storage hardware 122 to perform a variety of actions by communicating according to the SRA interface via the SRA module 120. For example, the actions may be categorized into two categories: discovery and recovery. The discovery operations may be used to determine which datastores are replicated and/or a current mount status of a datastore. The recovery operations may include failing over a datastore. Failing over a datastore may include generating a writeable copy of a snapshot of a datastore and making the writeable copy available to the Hypervisor module 108.

While the SRA interface may be defined in terms of replicating datastores, there are advantages of replicating in terms of VMs instead of datastores. The advantages may include the ability to replicate only the VMs of interest, the ability to replicate VMs on the same datastore using different schedules, and the ability to recover individual VMs without recovering an entire datastore. However, integrating an external replicator that replicates in terms of VMs into the SRA interface defined in terms of replicating datastores involves adapting the external replicator to replicate in terms of datastores. Adapting the external replicator may include first setting up a replication network on the source server 100 and the target server 138 and then pairing the source server 100 and the target server 138.

Figure 2:
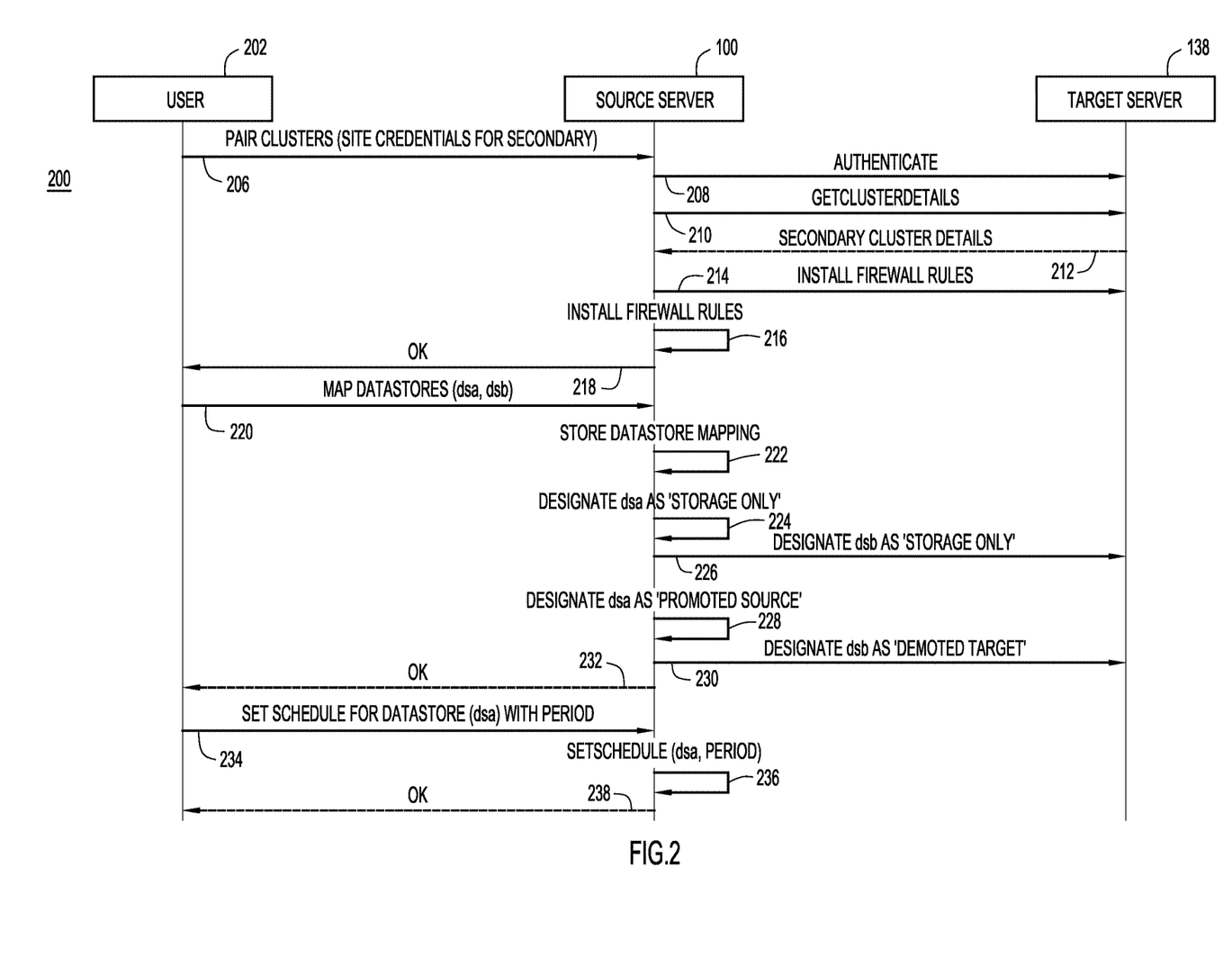
FIG. 2 is a sequence diagram for pairing, mapping, and scheduling replication between a source server and a target server, according to an example embodiment.

Turning to FIG. 2, and with continuing reference to FIG. 1, shown is a sequence diagram 200 for pairing, mapping, and scheduling replication between a source server 100 and a target server 138, according to an example embodiment. The sequence diagram 200 shows operations of a user 202, the source server 100, and the target server 138. The user 202 may interact with the source server 100 using, for example, the SRM module 106.

Operations 206-218 involve pairing the source server 100 with the target server 138. In operation 206, the user 202 may direct the source server 100 to pair with the target server 138 by providing credentials of the target server 138 to the source server 100. In operation 208, after receiving the credentials, the source server 100 may use the credentials to authenticate with the target server 138. At operation 210, after authenticating, the source server 100 may request details of the target server 138 from the target server 138. For example, the details of the target server 138 may include a number of datastores located at the target server 138. At operation 212, the target server 138 may provide to the source server 100 the details about the target server 138. At operation 214, the source server 100 may provide firewall rules to the target server 138 for installation to enable communications with the source server 100. At operation 216, the source server 100 may install firewall rules to enable communications with the target server 138. The firewall rules may enable the source server 100 and the target server 138 to communicate with each other during replication and recovery. After the firewall rules have been installed on the source server 100 and on the target server 138, the source server 100 may notify the user 202, at operation 218, that the source server 100 and the target server 138 have been paired.

Operations 220-232 are performed to map datastores of the source server 100 with datastores of the target server 138. At operation 220, the user 202 may request the source server 100 to map datastores of the source server 100 with datastores of the target server 138. The request may include indicators of which specific datastores of the source server 100 map with specific datastores of the target server 138. For example, the request may indicate that a datastore on the source server 100 (shown as "dsa") maps with a datastore on the target server 138 (shown as "dsb"). At operation 222, the source server 100 may store the datastore mapping provided by the user 202. In other words, the source server 100 may store that datastore dsa of the source server 100 maps with datastore dsb of the target server 138. At operation 224, the source server 100 may designate its datastore dsa as storage-only. At operation 226, the source server 100 may direct the target server 138 to designate its datastore dsb as storage-only as well. Designating a datastore as storage-only may mean that the datastore is controlled by an external recovery orchestrator, such as the SRM module 106. Additionally, further actions, such as unprotecting and recovering the datastore, are prohibited on any VM that is running on the storage-only datastore. At operation 228, the source server 100 may designate its datastore dsa as a promoted source. Here, a promoted datastore is defined as a datastore that is the active datastore, i.e., the datastore that is currently being used by the user 202. At operation 230, the source server 100 may direct the target server 138 to designate its datastore dsb as a demoted target. Here, a demoted datastore is defined as a datastore that is the replicated datastore, i.e., an inactive datastore. The datastores dsa and dsb in the source server 100 and the target server 138, respectively, are mapped. At operation 232, the source server 100 may notify the user 202 that the datastores dsa and dsb are mapped.

Operations 234-238 may schedule the replications for the datastore dsa on the source server 100. At operation 234, the user 202 may direct the source server 100 to replicate datastore dsa at a regular schedule. For example, the user 202 may direct the source server 100 to replicate the datastore dsa every 15 minutes. It should be appreciated that the user 202 may specify any time interval for replicating the datastore. It should also be appreciated that different datastores of the source server 100 may be replicated at different intervals. For example, while datastore dsa may be replicated every 15 minutes, a second datastore of the source server 100 may be set to be replicated every hour. At operation 236, the source server 100 may configure the datastore dsa to be replicated at the requested interval, here, every 15 minutes. At operation 238, after the replication schedule is set, the source server 100 may notify the user 202 that the replication schedule has been set.

Figure 3:
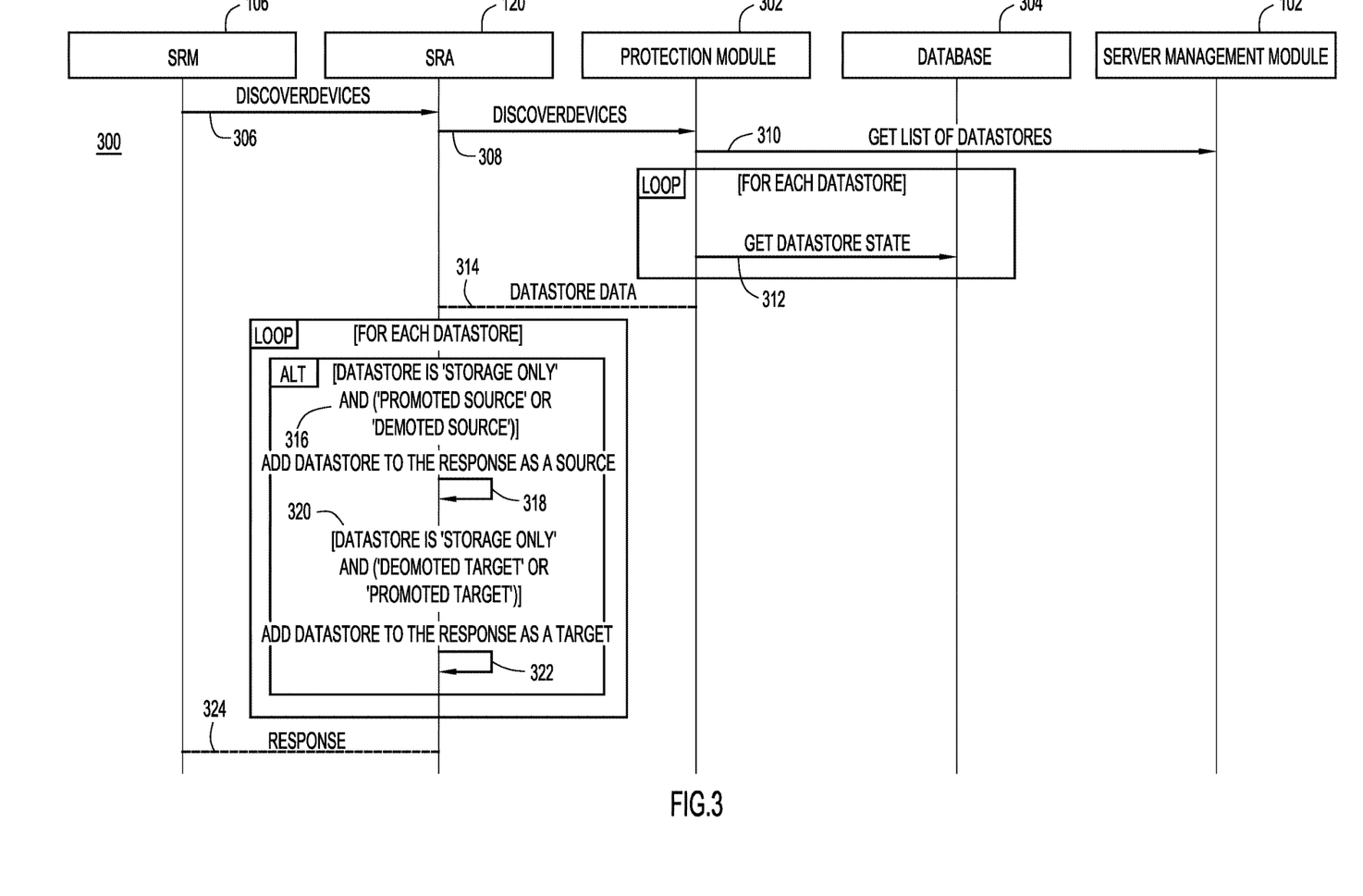
FIG. 3 is a sequence diagram for determining which datastores are replicated, according to an example embodiment.

Turning to FIG. 3, and with continuing reference to FIG. 1, shown is a sequence diagram 300 for determining which datastores are replicated, according to an example embodiment. The sequence diagram 300 depicts operations performed by the SRM module 106, the SRA 120, a protection module 302 of the source server 100, a database 304 of the source server 100, and the server management module 102. The protection module 302 and the database 304 may be components of the data service manager module 112, for example.

At operation 306, the SRM module 106 may request the SRA 120 to determine which datastores have been replicated. At operation 308, the SRA 120, in turn, may request the protection module 302 to determine which datastores have been replicated. At operation 310, the protection module 302 may request the server management module 102 to provide the list of replicated datastores. At operation 312, after receiving the list of replicated datastores, the protection module 302 may obtain from the database 304 a state for each datastore in the list of replicated datastores. For example, the state for each datastore may include whether the datastore is a source or a target datastore. Additionally, the state may also include whether the datastore is a promoted datastore or a demoted datastore, for example. At operation 314, the protection module 302 may provide to the SRA 120 each datastore and the state of each datastore.

At operation 316, the SRA 120 may determine, for each datastore, whether the datastore is designated as storage-only and if the datastore is a source promoted datastore or a source demoted datastore. If the SRA 120 determines that the datastore is designated as storage-only and is a source datastore, then the SRA 120, at operation 318, may include the datastore as a source datastore when responding to the SRM module's 106 request to determine which datastores are replicated. In contrast, the SRA 120 may determine whether the datastore is designated as storage-only and if the datastore is a target promoted datastore or a target demoted datastore at operation 320. If the SRA 120 determines that the datastore is designated as storage-only and is a target datastore, then the SRA 120, at operation 322, may include the datastore as a target datastore when responding to the SRM module's 106 request to determine which datastores are replicated. At operation 324, after the SRA 120 has determined whether each datastore is a source datastore or a target datastore, the SRA 120 may provide to the SRM module 106 a response that includes each datastore and whether the datastore is a source datastore or a target datastore.

Figure 4:
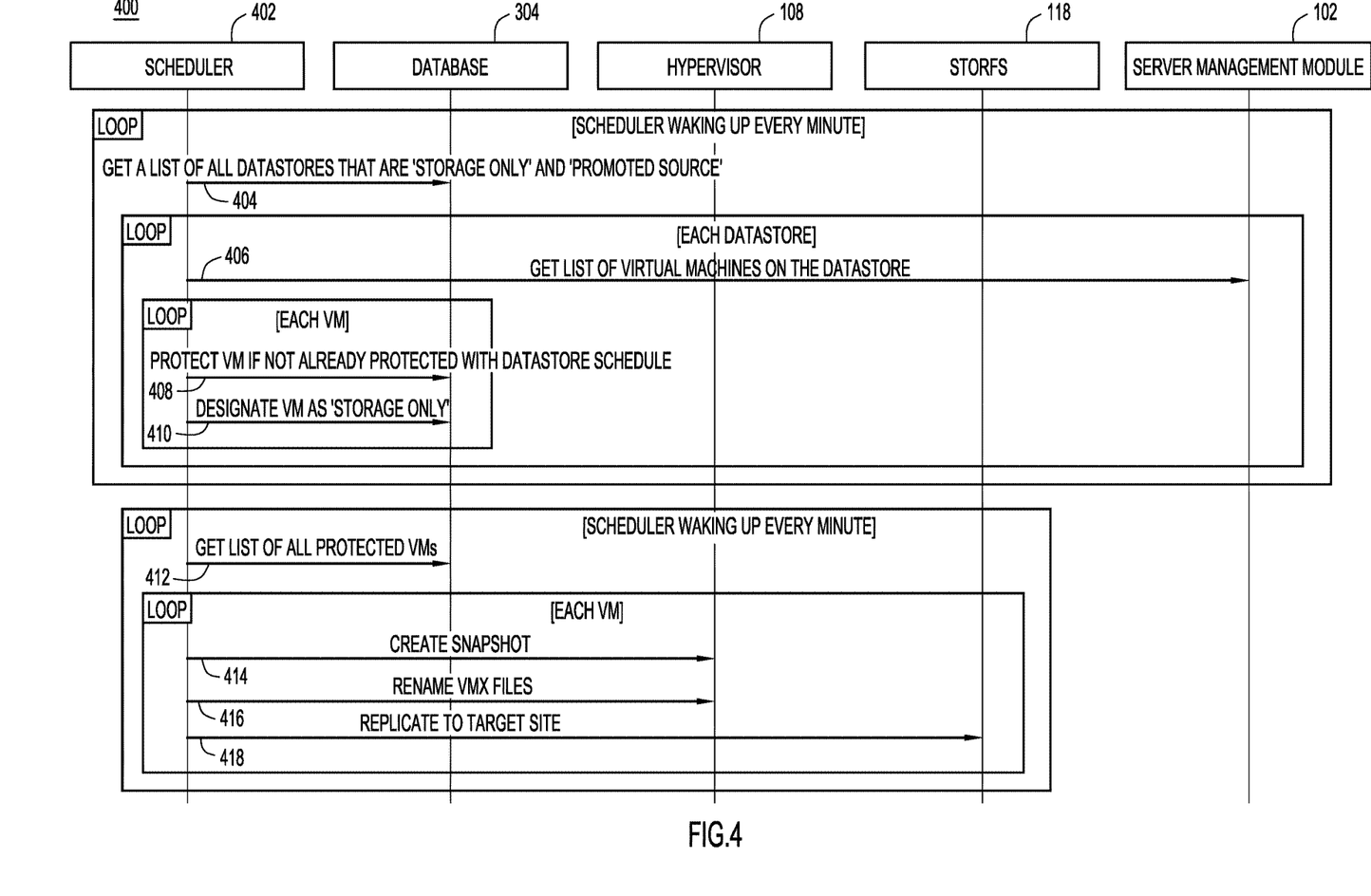
FIG. 4 is a sequence diagram of replicating a datastore of a source server to a target server, according to an example embodiment.

Turning to FIG. 4, and with continuing reference to FIGS. 1-3, shown is a sequence diagram 400 of replicating a datastore of a source server 100 at a target server 138, according to an example embodiment. The sequence diagram 400 depicts operations performed by a scheduler module 402 of the source server 100, the database 304 of the source server 100, the hypervisor module 108 of the source server 100, the file system module 118 of the source server 100, and the server management module 102 of the source server 100.

The scheduler module 402 may be configured to wake up or activate at a predetermined interval, such as every minute. The predetermined interval may be configured by the user 202 of the source server 100 when mapping datastores, as described in FIG. 2 above. Each time the scheduler module 402 wakes, the scheduler module 402 may request, at operation 404, a list of all datastores that are designated as storage-only and are promoted sources from the database 304. At operation 406, for each datastore obtained from the database 304, the scheduler module 402 may obtain a list of all VMs that are on a given datastore from the server management module 102. For each VM on the given datastore, the scheduler module 402, at operation 408, may request the database 304 to protect the VM with the datastore schedule, as described above in FIG. 2. At operation 410, the scheduler module 402 may also designate the VM as storage-only.

After each VM on a given datastore is protected with a datastore schedule and designated as storage-only, the scheduler module 402, at operation 412, may request from the database 304 a list of all protected VMs each time the scheduler module 402 wakes. For each protected VM, the scheduler module 402, at operation 414, may generate a snapshot of each protected VM. The snapshot may include a plurality of configuration files representing, for example, an operating state of the protected VM. At operation 416, the scheduler module 402 may rename the configuration files for the protected VM. At operation 418, the scheduler module 402 may direct the storage module 118 to replicate the renamed configuration files to the target server 138. These techniques enable replicating the VMs of the source server 100 at the target server 138.

Figure 5:
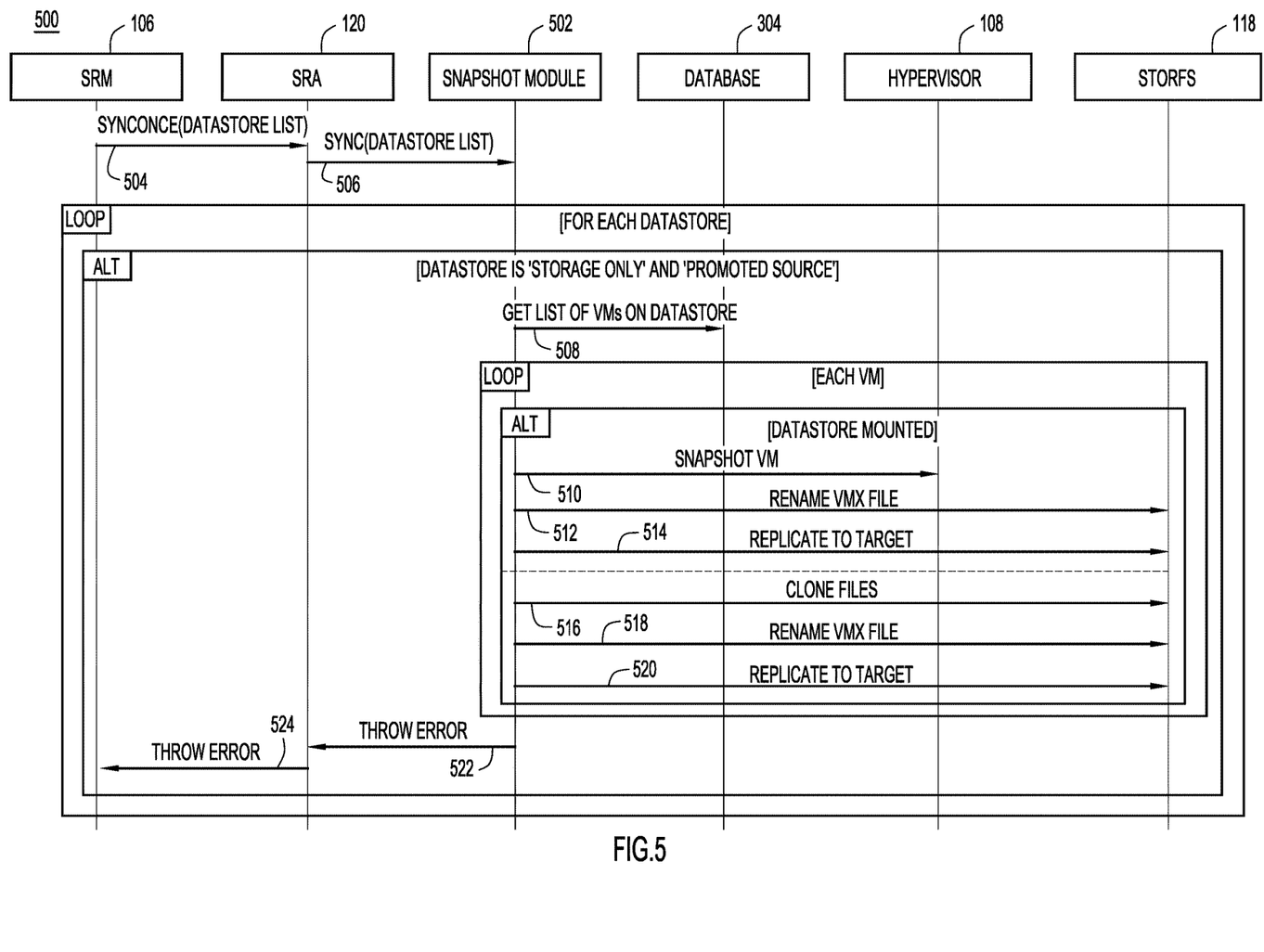
FIG. 5 is a sequence diagram for testing a recovery plan, according to an example embodiment.

Turning to FIG. 5, and with continuing reference to FIGS. 1-3, shown is a sequence diagram 500 for testing a recovery plan, according to an example embodiment. The sequence diagram 500 depicts operations performed by the SRM module 106, the SRA 120, a snapshot module 502, the database 304, the hypervisor module 108, and the storage module 118.

At operation 504, the SRM module 106 may direct the SRA 120 to perform a sync once operation. The sync once operation may provide a workflow to test the recovery plan. Included within the sync once operation may be a list of one or more datastores for the SRA 120 to replicate. In operation 506, the SRA 120 may direct the snapshot module 502 to perform the sync once operation. The SRA 120 may provide the list of one or more datastores received from the SRM module 106 to the snapshot module 502. In response, for each datastore in the list, the snapshot module 502 may determine whether the datastore is storage-only and whether it is designated as a promoted source. If the datastore is storage-only and a promoted source, the snapshot module 502, at operation 508, may obtain a list of each VM on the datastore from the database 304. For each VM on the datastore, the snapshot module 502 may determine if the datastore associated with each VM is mounted. If the datastore is mounted, then the snapshot module 502 may direct the hypervisor module 108 to generate a snapshot of the VM at operation 510. As described above, the snapshot may include a plurality of configuration files representing an operating state of the VM. After the snapshot is generated, the snapshot module 502 may direct the storage module 118 to rename the plurality of configuration files at operation 512. At operation 514, once the configuration files have been renamed, the snapshot module 502 may direct the storage module 118 to replicate the renamed configuration files at the target server 138.

However, if the datastore associated with the VM is not mounted, then the snapshot module 502 may direct the storage module 118 to clone the files of the VM at operation 516. At operation 518, after the files have been cloned, the snapshot module 502 may direct the storage module 118 to rename the cloned files. After the cloned files have been renamed, the snapshot module 502 may direct the storage module 118 to replicate the renamed cloned files to the target server 138 at operation 520. These techniques enable the user to determine whether protection and replication of a specified set of datastores is functioning.

However, if the snapshot module 502 determines that a datastore in the list provided by the SRA 120 is either not designated as storage-only and/or is not designated as a promoted source, the snapshot module 502 may return an error to the SRA 120 at operation 522. In response, at operation 524, the SRA 120 may then return the error to the SRM module 106, which may provide the error to the user.

Figure 6A:
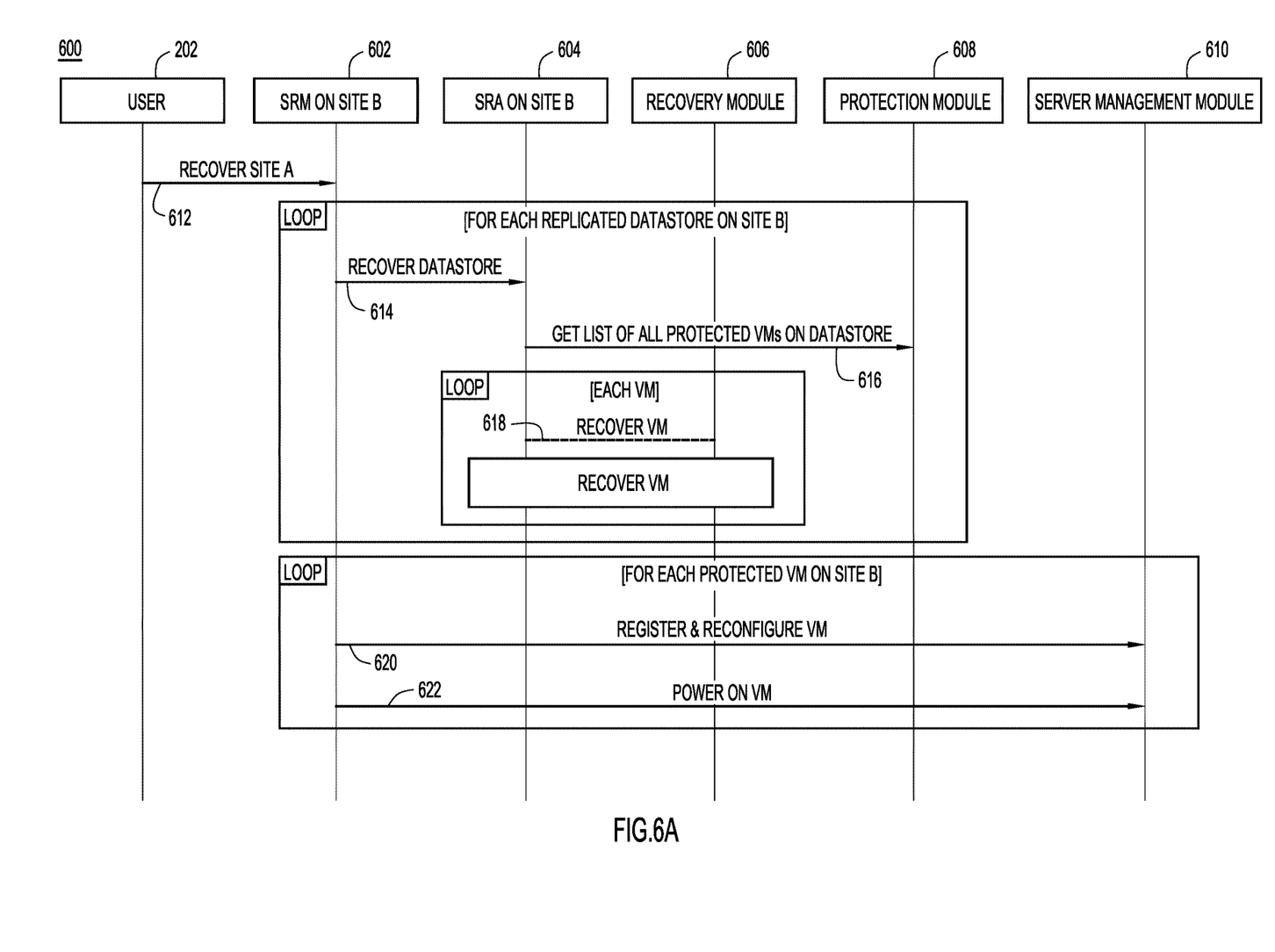
FIGS. 6A and 6B are sequence diagrams for performing the recovery of replicated datastores, according to an example embodiment.
Figure 6B:
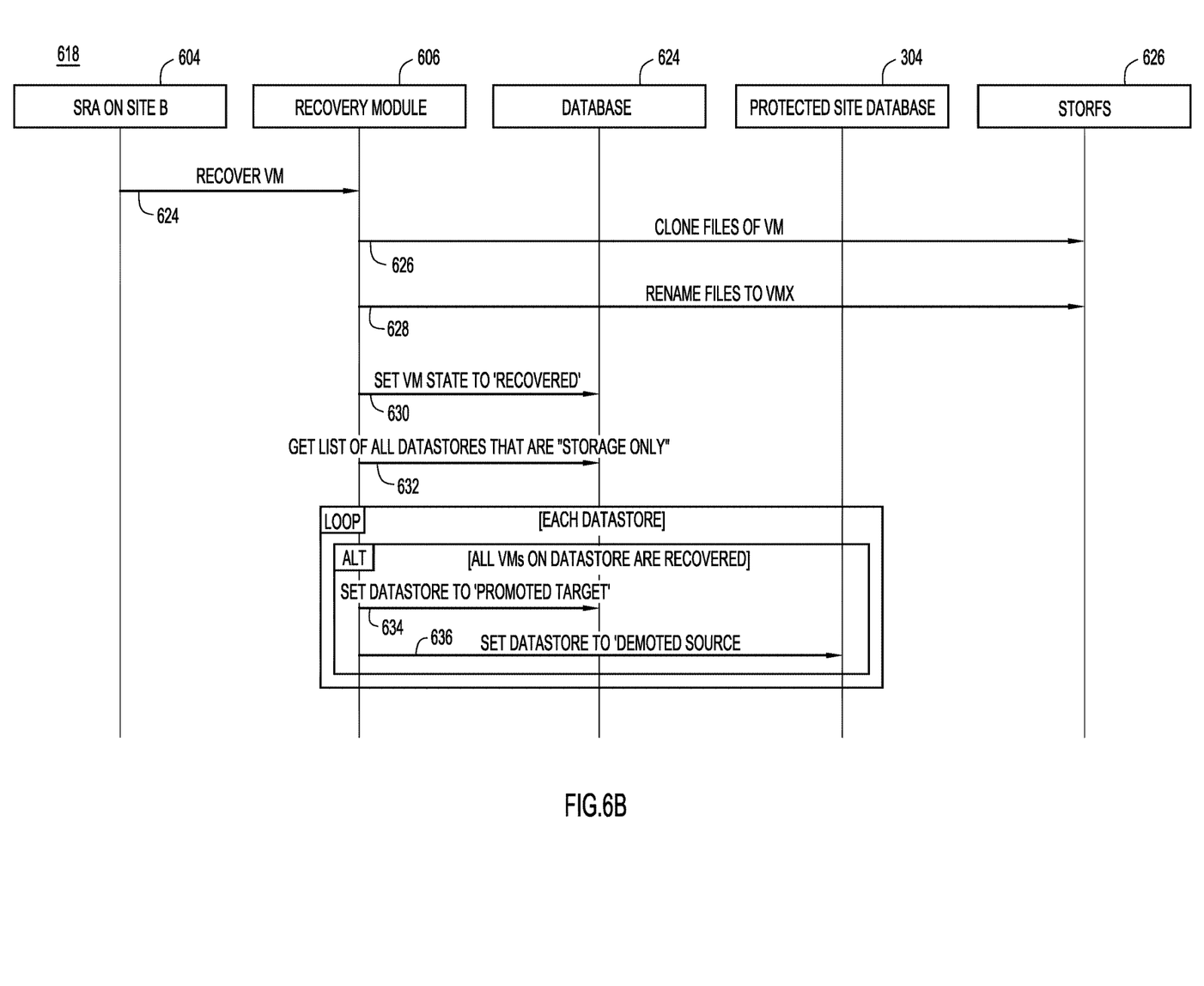

Turning to FIGS. 6A and 6B, and with continuing reference to FIGS. 1 and 2, shown are sequence diagrams for performing a recovery of replicated datastores, according to an example embodiment.

FIG. 6A depicts a sequence of operations 600 performed by a user 202, the SRM module 602 of the target server 138, the SRA 604 of the target server 138, the recovery module 606 of the target server 138, the protection module 608 of the target server 138, and the server management module 610 of the target server 138. The recovery module 606 and protection module 608 may be part of a data service manager component of the target server 138. Protection Module 608 may be similar to (and complementary of) the protection module 302 which is a part of the data service manager component 112.

For example, at operation 612, the user 202 may direct the SRM module 602 of the target server 138 to recover the source server 100. In response, at operation 614, the SRM module 602 of the target server 138 may direct the SRA 604 of the target server 138 to recover each datastore that was replicated on the target server 138. In response, for each datastore, the SRA 604 on the target server 138 may obtain from the protection module 608 each protected VM on the datastore at operation 616. At operation 618, for each protected VM, the SRA 604 may direct the recovery module 606 to recover each protected VM, as described in more detail in FIG. 6B below.

After each VM is recovered, the SRM 602 at the target server 138 may direct the server management module 610 to register and reconfigure each of the recovered VMs at operation 620. At operation 622, after the VM has been registered and recovered, the SRM 602 of the target server 138 may direct the server management module 610 to power on the VM, thus making the VM available for use.

Turning to FIG. 6B, shown is a sequence diagram detailing operation 618 for recovering a VM, according to an example embodiment. The sequence diagram depicts operations performed by the SRA 604 of the target server 138, the recovery module 606 of the target server 138, a database 624 of the target server 138, the database 304 of the source server, and a storage module 626 of the target server 138.

For example, at operation 624, the SRA 604 of the target server 138 may direct the recovery module 606 to recover a VM. In response, the recovery module 606 may direct the storage module 626 to clone the configuration files of the VM at operation 626. At operation 628, after the configuration files have been cloned, the recovery module 606 may direct the storage module 626 to rename the cloned files. Once the cloned files have been renamed, the recovery module 606 designates a state of the VM as recovered at operation 630.

At operation 632, the recovery module 606 may obtain a list of all datastores at the target server 138 that are designated as storage-only. For each such datastore, the recovery module 606 directs the database 624 at the target server 138 to designate the datastore at the target server 138 as a promoted target at operation 634. At operation 636, the recovery module 606 may direct the database 304 of the source server 100 to designate the datastore of the source server 100 as a demoted source. These techniques enable recovering VMs that are located on a datastore to be recovered.

Figure 7:
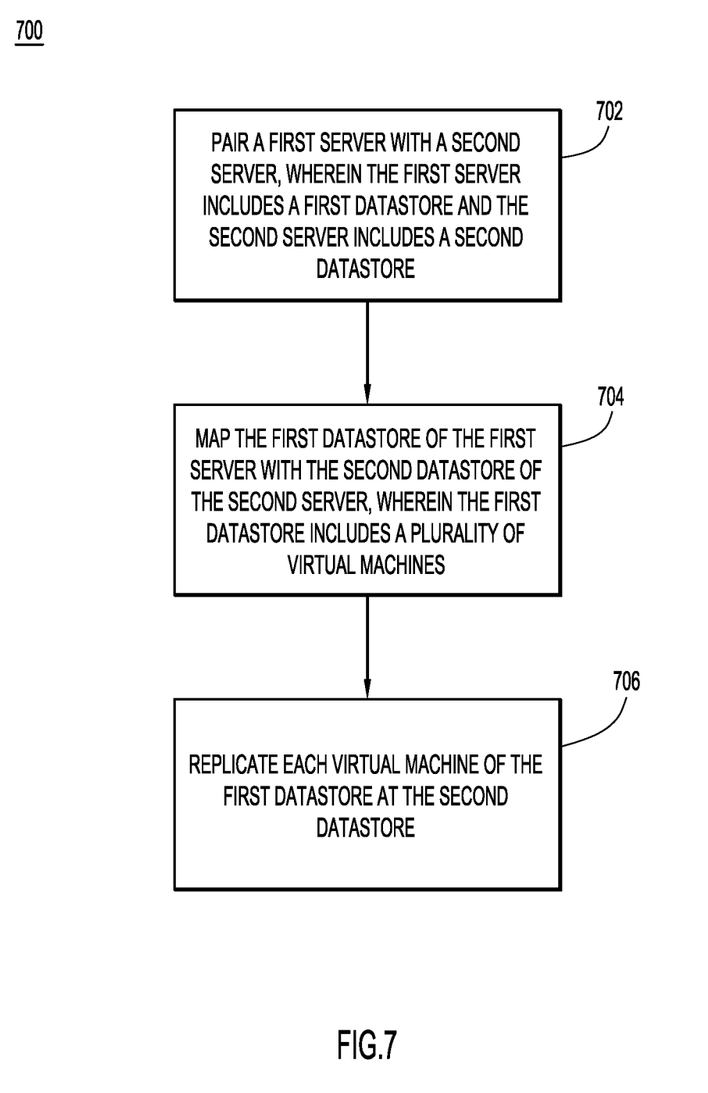
FIG. 7 is a flowchart depicting a method for protecting and replicating virtual machines of a source server to a target server, according to an example embodiment.

Turning to FIG. 7, shown is a flowchart depicting a method 700 for protecting and replicating VMs of a source server at a target server, according to an example embodiment. For example, the method 700 may be performed by controller VM 112 and/or the SRA 120, as shown in FIG. 1.

At operation 702, a first server, such as a source server, may be paired with a second server, such as a target server. The first server may include a first datastore and the second server may include a second datastore. For example, a user of the source server may request the first server to initiate a pairing operation with the target server. The pairing operation may include obtaining details about the target server and configuring firewall rules at both the target server and the source server, for example. The pairing operation may also include setting a replication schedule for the datastores of the source server. For example, the replication schedule may replicate a datastore periodically.

At operation 704, the first datastore may be mapped to the second datastore. The first datastore may include a plurality of VMs, for example. The mapping operations may include designating the datastores as storage-only. Additionally, the datastores of the source server may be designated as promoted while the datastores of the target server may be designated as demoted.

At operation 706, each VM on the first datastore may be replicated at the second datastore. For example, a scheduler module of the source server may periodically wake. Each time the scheduler module wakes, the scheduler module may request from a database of the source server a list of all datastores of the source server that are designated as storage-only and are promoted sources. For each such datastore, the scheduler module of the source server may then obtain a list of all VMs on the datastore. If necessary, each VM on the datastore may be protected using a replication schedule, as discussed in operation 702. For each VM, the scheduler module may direct a hypervisor module of the source server to generate a snapshot for the VM. The snapshot may include a plurality of configuration files that reflect an operating state of the VM. The configuration files may then be renamed. The renamed configuration files may be replicated at the target server. In this manner, replication may be VM-based even when an SRA replicates based on datastores. After operation 706 completes, the method 700 may end.

Figure 8:
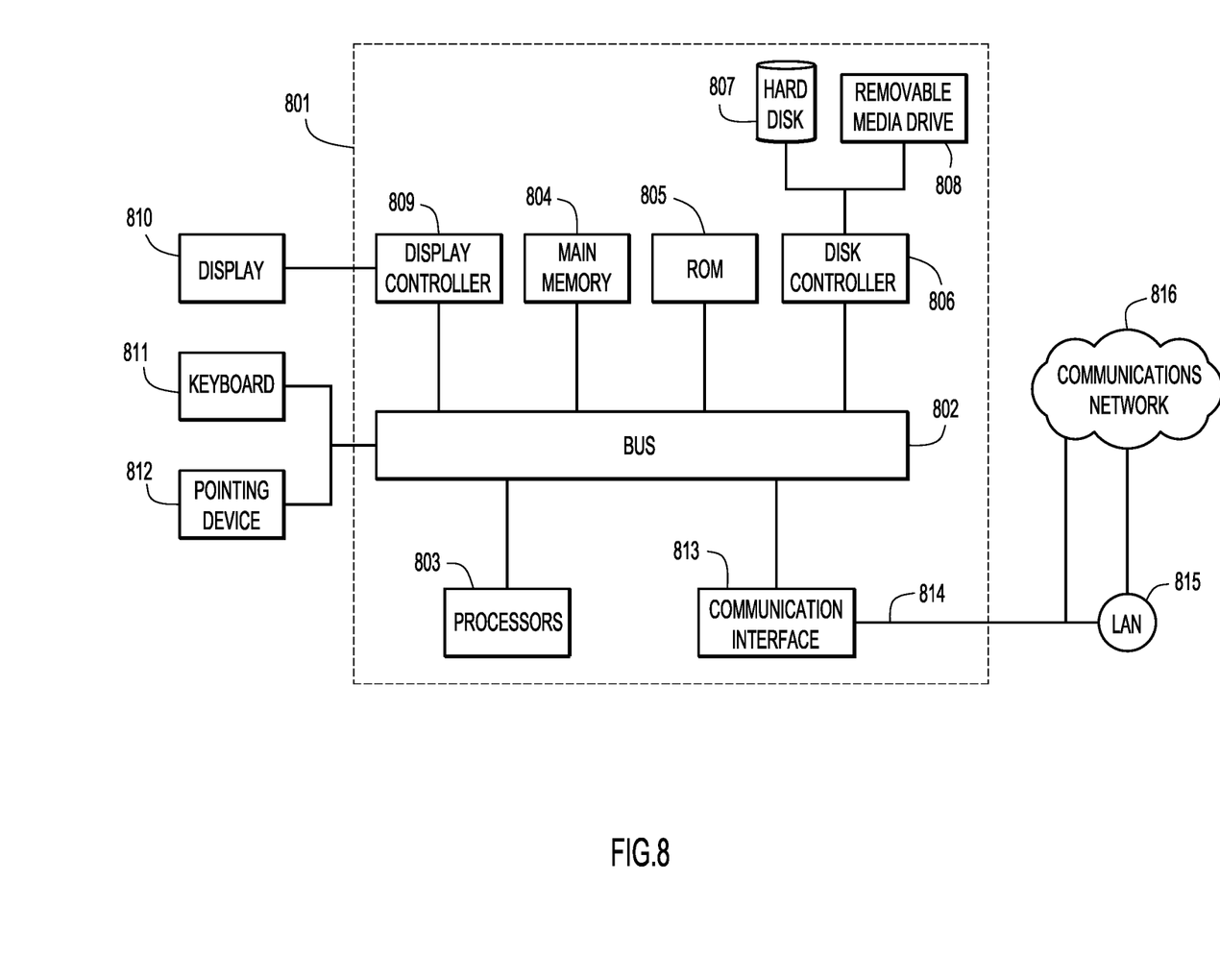
FIG. 8 is a block diagram of a source server, configured to perform protection, replication, and recovery of virtual machines techniques, according to an example embodiment.

FIG. 8 is a block diagram showing a server, e.g., source server 100 shown in FIG. 1, configured to perform protection, replication, and recovery of VMs techniques, according to an example embodiment. FIG. 8 illustrates a computer system 801 upon which the embodiments presented may be implemented. The computer system 801 includes a bus 802 or other communication mechanism for communicating information, and a processor 803 coupled with the bus 802 for processing the information. While the figure shows a single block 803 for a processor, it should be understood that the processors 803 represent a plurality of processing cores, each of which can perform separate processing. The computer system 801 also includes a main memory 804, such as a random access memory (RAM) or other dynamic storage device (e.g., dynamic RAM (DRAM), static RAM (SRAM), and synchronous DRAM (SD RAM)), coupled to the bus 802 for storing information and instructions to be executed by processor 803. In addition, the main memory 804 may be used for storing temporary variables or other intermediate information during the execution of instructions by the processor 803.

The computer system 801 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The computer system 801 also includes a disk controller 806 coupled to the bus 802 to control one or more storage devices for storing information and instructions, such as a magnetic hard disk 807, and a removable media drive 08 (e.g., read-only compact disc drive, read/write compact disc drive). The storage devices may be added to the computer system 801 using an appropriate device interface (e.g., small computer system interface (SCSI), integrated device electronics (IDE), enhanced-IDE (E-IDE), direct memory access (DMA), or ultra-DMA).

The computer system 801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 801 may also include a display controller 809 coupled to the bus 802 to control a display 810, such as a cathode ray tube (CRT), for displaying information to a computer user. The computer system 801 includes input devices, such as a keyboard 811 and a pointing device 812, for interacting with a computer user and providing information to the processor 803. The pointing device 812, for example, may be a mouse, a trackball, or a trackpad for communicating direction information and command selections to the processor 803 and for controlling cursor movement on the display 810.

The computer system 801 performs a portion or all of the processing steps of the process in response to the processor 803 executing one or more sequences of one or more instructions contained in a memory, such as the main memory 804. Such instructions may be read into the main memory 804 from another computer readable medium, such as a hard disk 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the computer system 801 includes at least one computer readable medium or memory for holding instructions programmed according to the embodiments presented, for containing data structures, tables, records, or other data described herein. Examples of computer readable media are compact discs, hard disks, PROMs (EPROM, EEPROM, flash EPROM), DRAM, SRAM, SD RAM, or any other magnetic medium, compact discs (e.g., CD-ROM), or any other optical medium or other physical medium from which a computer can read.

Stored on any one or on a combination of non-transitory computer readable storage media, embodiments presented herein include software for controlling the computer system 801, for driving a device or devices for implementing the process, and for enabling the computer system 801 to interact with a human user. Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 801 also includes a communication interface 813 coupled to the bus 802. The communication interface 813 provides a two-way data communication coupling to a network link 814 that is connected to, for example, a local area network (LAN) 815, or to another communications network 816 such as the Internet. For example, the communication interface 813 may be a wired or wireless network interface card to attach to any packet switched (wired or wireless) LAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 814 may provide a connection to another computer through a local area network 815 (e.g., a LAN) or through equipment operated by a service provider, which provides communication services through a communications network 816. The local network 814 and the communications network 816 use, for example, electrical, electromagnetic, or optical signals that carry digital data streams, and the associated physical layer (e.g., CAT 5 cable, coaxial cable, optical fiber, etc.). The signals through the various networks and the signals on the network link 814 and through the communication interface 813, which carry the digital data to and from the computer system 801 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 801 can transmit and receive data, including program code, through the network(s) 815 and 816, the network link 814 and the communication interface 813.

In summary, the techniques describe a method that includes pairing a first server with a second server, wherein the first server includes a first datastore and the second server includes a second datastore. The method then maps the first datastore of the first server with the second datastore of the second server, wherein the first datastore includes a plurality of virtual machines. Finally, the method replicates each virtual machine of the first datastore at the second datastore.

In another embodiment, the method also includes causing each virtual machine of the first datastore replicated at the second datastore to be recovered when the first datastore becomes unavailable.

In another aspect, causing each virtual machine of the first datastore replicated at the second datastore to be recovered includes further steps. For example, the additional steps include obtaining a list of virtual machines included in the second datastore, registering each virtual machine in the list of virtual machines, and activating each registered virtual machine.

In another embodiment, the replicating step may include additional steps. For example, the replicating may include configuring each virtual machine of the first datastore as storage only. When each virtual machine is designated as storage only, the method may then generate a snapshot for each virtual machine of the first datastore, wherein each snapshot includes a configuration file including configuration information for the respective virtual machine. The method may then rename each configuration file to be replicated at the second datastore.

In yet another embodiment, the first datastore is configured as a promoted source and the second datastore is configured as a demoted target.

In another aspect, when the first datastore is configured as a promoted source and the second datastore is configured as a demoted target, the first datastore and the second datastore are configured as storage only datastores.

In yet another aspect, replicating each virtual machine occurs are predetermined intervals.

In another embodiment, an apparatus may include a communication interface configured to enable network communications; a processing device coupled with the communication interface. The processing device is configured to pair the apparatus with a first server, wherein the apparatus includes a first datastore and the first server includes a second datastore. After the apparatus is paired with the first server, the processing device then maps the first datastore of the apparatus with the second datastore of the first server, wherein the first datastore includes a plurality of virtual machines. The processing device then replicates each virtual machine of the first datastore at the second datastore.

In another embodiment, one or more non-transitory computer readable storage media encoded with instructions is described. The instructions, when executed by a processor, cause the processor to pair with a first server, wherein the apparatus includes a first datastore and the first server includes a second datastore. The processor then maps the first datastore of the apparatus with the second datastore of the first server, wherein the first datastore includes a plurality of virtual machines. Finally, the processor replicates each virtual machine of the first datastore at the second datastore.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   pairing a first server with a second server, wherein the first server includes a first datastore and the second server includes a second datastore;
   mapping the first datastore of the first server with the second datastore of the second server, wherein the first datastore includes a plurality of virtual machines;
   replicating each virtual machine of the first datastore at the second datastore; and
   causing each virtual machine of the first datastore replicated at the second datastore to be recovered when the first datastore becomes unavailable by:
   obtaining a list of virtual machines included in the second datastore;
   registering each virtual machine in the list of virtual machines; and
   activating each registered virtual machine.

2. The method of claim 1, wherein replicating further comprises:
   configuring each virtual machine of the first datastore as storage only;
   generating a snapshot for each virtual machine of the first datastore, wherein each snapshot includes a configuration file including configuration information for the respective virtual machine; and
   renaming each configuration file to be replicated at the second datastore.

3. The method of claim 1, wherein the first datastore is configured as a promoted source and the second datastore is configured as a demoted target.

4. The method of claim 3, wherein the first datastore and the second datastore are configured as storage only datastores.

5. The method of claim 1, wherein replicating each virtual machine occurs at predetermined time intervals.

6. An apparatus comprising:
   a communication interface configured to enable network communications on behalf of a first server;
   a first datastore;
   a processing device of the first server coupled to the communication interface and the first datastore, and configured to:
   pair the first server with a second server, wherein the first server includes the first datastore and the second server includes a second datastore;
   map the first datastore with the second datastore of the second server, wherein the first datastore includes a plurality of virtual machines;
   replicate each virtual machine of the first datastore at the second datastore; and
   cause each virtual machine of the first datastore replicated at the second datastore to be recovered when the first datastore becomes unavailable by: obtaining a list of virtual machines included in the second datastore; registering each virtual machine in the list of virtual machines; and activating each registered virtual machine.

7. The apparatus of claim 6, wherein the processing device is further configured to:
   configure each virtual machine of the first datastore as storage only;
   generate a snapshot for each virtual machine of the first datastore, wherein each snapshot includes a configuration file including configuration information for the respective virtual machine; and
   rename each configuration file to be replicated at the second datastore.

8. The apparatus of claim 6, wherein the first datastore is configured as a promoted source and the second datastore is configured as a demoted target.

9. The apparatus of claim 8, wherein the first datastore and the second datastore are configured as storage only datastores.

10. The apparatus of claim 6, wherein the processing device is configured to replicate each virtual machine occurs at predetermined time intervals.

11. A method comprising:
    pairing a source server with a target server, wherein the source server includes a first datastore and the target server includes a second datastore, the first datastore including a plurality of virtual machines;
    mapping the first datastore of the source server to the second datastore of the target server;
    instructing, via a storage replicator interface of the source server, an external replicator to replicate data between the source server and the target server, wherein the storage replicator interface is defined in terms of replicating datastores and the external replicator replicates in terms of virtual machines, and the external replicator is adapted via the storage replicator interface to carry out replication of datastores; and replicating the first datastore on the second datastore via the external replicator by replicating the virtual machines of the first datastore on the second datastore.

12. The method of claim 11, further comprising:

in response to the first datastore becoming unavailable, causing each virtual machine of the first datastore replicated at the second datastore to be recovered by activating each virtual machine included in the second datastore.

13. The method of claim 11, wherein replicating further comprises generating a snapshot for each virtual machine of the first datastore, wherein each snapshot includes a configuration file including configuration information for the respective virtual machine.

* * * * *